United States Patent
Legatski et al.

(10) Patent No.: US 12,184,709 B2
(45) Date of Patent: Dec. 31, 2024

(54) ACTIVE SPEAKER PROXY PRESENTATION FOR SIGN LANGUAGE INTERPRETERS

(71) Applicant: Zoom Video Communications, Inc., San Jose, CA (US)

(72) Inventors: Richard Dean Legatski, Castle Rock, CO (US); Thomas William Noble, Murfreesboro, TN (US)

(73) Assignee: Zoom Video Communications, Inc., San Jose, CA (US)

( * ) Notice: Subject to any disclaimer, the term of this patent is extended or adjusted under 35 U.S.C. 154(b) by 68 days.

(21) Appl. No.: 17/733,978

(22) Filed: Apr. 29, 2022

(65) Prior Publication Data

US 2023/0353613 A1 Nov. 2, 2023

(51) Int. Cl.
*H04L 65/403* (2022.01)
*G06F 3/04847* (2022.01)
*G09B 21/00* (2006.01)
*G06F 3/04842* (2022.01)

(52) U.S. Cl.
CPC ........ *H04L 65/403* (2013.01); *G06F 3/04847* (2013.01); *G09B 21/009* (2013.01); *G06F 3/04842* (2013.01)

(58) Field of Classification Search
CPC .. H04L 65/403; G06F 3/04847; G09B 21/009
See application file for complete search history.

(56) References Cited

U.S. PATENT DOCUMENTS

| | | | |
|---|---|---|---|
| 10,122,968 B1* | 11/2018 | Talbot | H04M 3/38 |
| 10,127,833 B1* | 11/2018 | Utley | H04L 65/4053 |
| 10,757,251 B1* | 8/2020 | Matula | G06F 40/58 |
| 11,792,468 B1* | 10/2023 | Legatski | H04N 5/45 725/34 |
| 2004/0210603 A1* | 10/2004 | Roston | G06F 40/47 |
| 2006/0125914 A1* | 6/2006 | Sahashi | H04N 7/147 348/E7.083 |
| 2015/0019201 A1* | 1/2015 | Schoenbach | G06F 40/58 704/8 |
| 2017/0024377 A1* | 1/2017 | Olkhovsky | H04L 65/1104 |
| 2017/0277684 A1* | 9/2017 | Dharmarajan Mary | G10L 13/00 |
| 2021/0335502 A1* | 10/2021 | Cordell | G06F 40/58 |
| 2023/0073828 A1* | 3/2023 | Vendrow | G06F 3/0304 |

* cited by examiner

*Primary Examiner* — Olisa Anwah (74) *Attorney, Agent, or Firm* — Kilpatrick Townsend & Stockton LLP (57) ABSTRACT

Methods and systems provide for an active server proxy presentation for sign language interpreters within a video communication session. In one embodiment, a method presents a user interface for each of a number of client devices connected to a communication session, with each UI including one or more video feeds associated with participants of the communication session. The method receives an indication that a first participant is designating a second participant as a sign language interpreter who will perform voicing for the first participant. The method then determines that the second participant is performing voicing for the first participant, then presents, within the UIs of at least a subset of the client devices, a video feed associated with the first participant in a highlighted fashion concurrently to the second participant performing the voicing for the first participant.

20 Claims, 6 Drawing Sheets

ACTIVE SPEAKER PROXY PRESENTATION FOR SIGN LANGUAGE INTERPRETERS

FIELD

The present application relates generally to digital communication, and more particularly, to systems and methods for providing an active speaker proxy presentation for sign language interpreters within a video communication session.

SUMMARY

The appended claims may serve as a summary of this application.

BRIEF DESCRIPTION OF THE DRAWINGS

The present application relates generally to digital communication, and more particularly, to systems and methods providing for an active speaker proxy presentation for sign language interpreters within a video communication platform.

The present disclosure will become better understood from the detailed description and the drawings, wherein.

DETAILED DESCRIPTION OF THE DRAWINGS

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Due to the explosive growth and global nature of remote video communication, today's global workplace presents more challenges for inclusivity than ever before. Participants of video communication sessions often have varying ways to communicate based on their abilities. One example is the use of sign languages during video communication sessions, such as, e.g., American Sign Language ("ASL") or British Sign Language ("BSL"). Some users, such as, for example, deaf or hard-of-hearing ("DHH") persons, may have some loss that impacts their ability to process linguistic information. Some such users may be non-verbal in that they cannot hear nor speak, or may have trouble hearing or speaking. Such users may rely on sign language interpreters ("SLIs") to speak for them while simultaneously interpreting others' speech for them. SLIs thus may provide bi-directional interpretation for DHH participants. However, there are limitations in the current methods of presentation for video communication sessions with respect to enabling users of sign languages to participate in such sessions.

One key problem, for example, is that with current video communication sessions, the perception of the SLI and the DHH participant are not directly associated with each other. That is, if the DHH participant is trying to participate in a meeting and expresses something using sign language, and the SLI voices that expression on the DHH participant's behalf, then the SLI is the one who will typically show up as an active speaker in the session, rather than the DHH participant who is expressing themselves. This creates an inequitable experience for a non-verbal DHH participant, who should have the ability to appear as if they are the one speaking while the SLI provides voicing for them. As a result, it is common for meetings with DHH participants and other non-verbal individuals to have inequitable participation and engagement in relation to verbal individuals during video communication sessions.

Thus, there is a need in the field of digital communication tools and platforms to create new and useful systems and methods for providing an active speaker proxy presentation for sign language interpreters within the video communication session. The source of the problem, as discovered by the inventors, is a lack of a presentation feature that allows a non-verbal participant to designate an SLI as their active speaker proxy, such that when the SLI speaks, the non-verbal participant will appear as an active speaker during the communication session.

The methods and systems described herein allow a non-verbal participant within a communication session, such as a DHH person, to designate a sign language interpreter who will perform voicing on their behalf Upon the system determining that the designated person is speaking on behalf of the non-verbal participant, the system will highlight the video feed of the non-verbal participant during the period when the SLI is speaking. Highlighting may mean, in various embodiments, showing the video feed of that user as the "active speaker", i.e., the visible or prominent feed shown to other participants; or providing some visual adjustment to a UI component for the video feed, such as a colored border around the feed or a resizing to make the feed appear larger than other feeds; or any other suitable way to highlight the video feed of the non-verbal participant while their interpreter is speaking on their behalf.

In one embodiment, a method presents a user interface ("UI") for each of a number of client devices connected to a communication session, with each UI including one or more video feeds associated with participants of the communication session. The method receives an indication that a first participant is designating a second participant as a sign language interpreter who will perform voicing for the first participant. The method then determines that the second participant is performing voicing for the first participant, then presents, within the UIs of at least a subset of the client devices, a video feed associated with the first participant in a highlighted fashion concurrently to the second participant performing the voicing for the first participant.

Although the context described herein relates most often to a DHH or other non-verbal participant and an SLI who speaks on their behalf, other contexts and situations may alternatively or additionally arise. For example, an interpreter may be designated to voice on behalf of a foreign speaker. In such a case, it would be equitable for the foreign speaker to appear as an active speaker while the interpreter is voicing for them. Similarly, a teacher or lecturer may wish to appear as a highlighted video feed even when a student is speaking. The methods and systems herein provide a solution for such contexts and situations as well.

Further areas of applicability of the present disclosure will become apparent from the remainder of the detailed description, the claims, and the drawings. The detailed description and specific examples are intended for illustration only and are not intended to limit the scope of the disclosure.

Figure 1A:
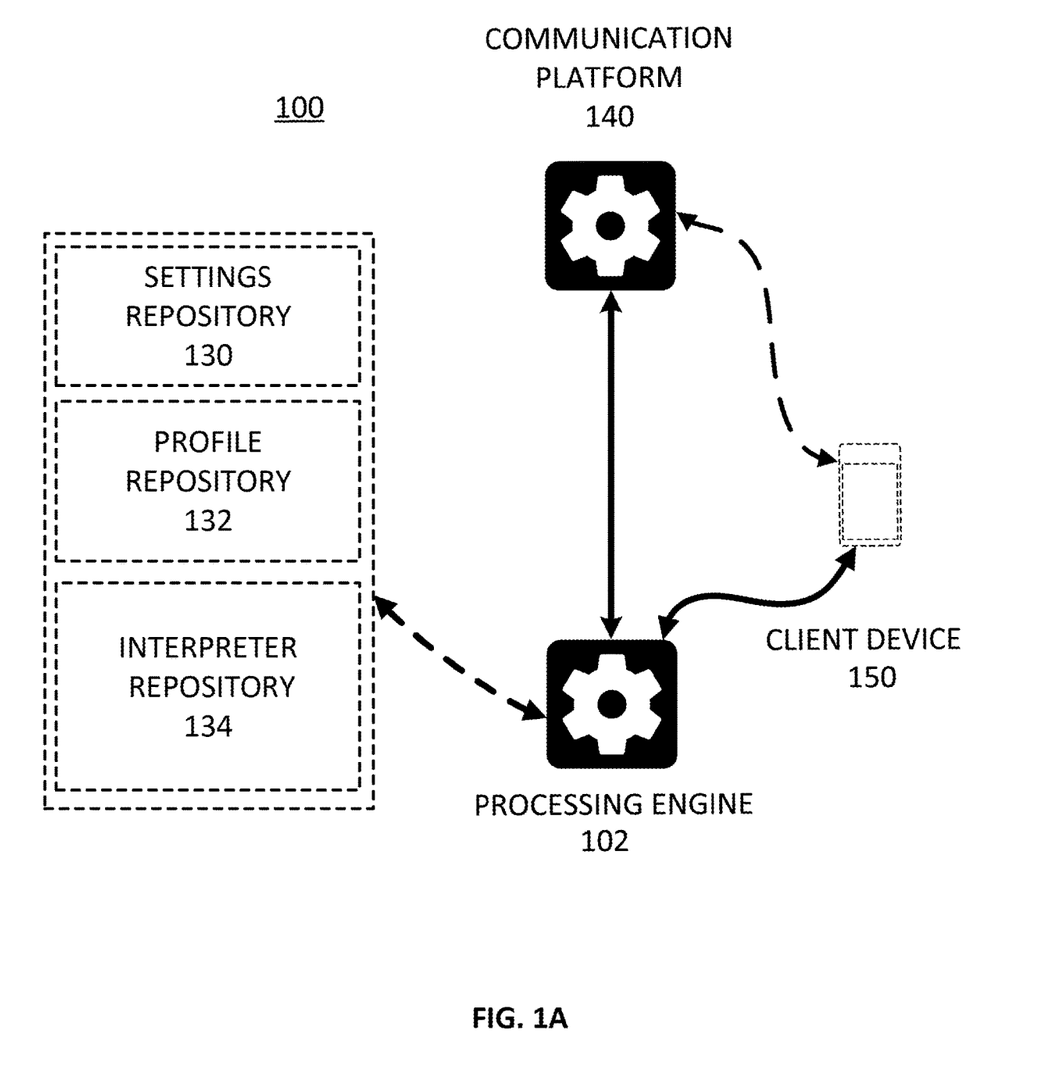
FIG. 1A is a diagram illustrating an exemplary environment in which some embodiments may operate.

FIG. 1A is a diagram illustrating an exemplary environment in which some embodiments may operate. In the exemplary environment 100, a client device 150 is connected to a processing engine 102 and, optionally, a video communication platform 140. The processing engine 102 is connected to the video communication platform 140, and optionally connected to one or more repositories and/or databases, including, e.g., a settings repository 130, profile repository 132, and/or an interpreter repository 134. One or more of the databases may be combined or split into multiple databases. The user's client device 150 in this environment may be a computer, and the video communication platform 140 and processing engine 102 may be applications or software hosted on a computer or multiple computers which are communicatively coupled via remote server or locally.

The exemplary environment 100 is illustrated with only one client device, one processing engine, and one video communication platform, though in practice there may be more or fewer additional client devices, processing engines, and/or video communication platforms. In some embodiments, the client device(s), processing engine, and/or video communication platform may be part of the same computer or device.

Figure 2:
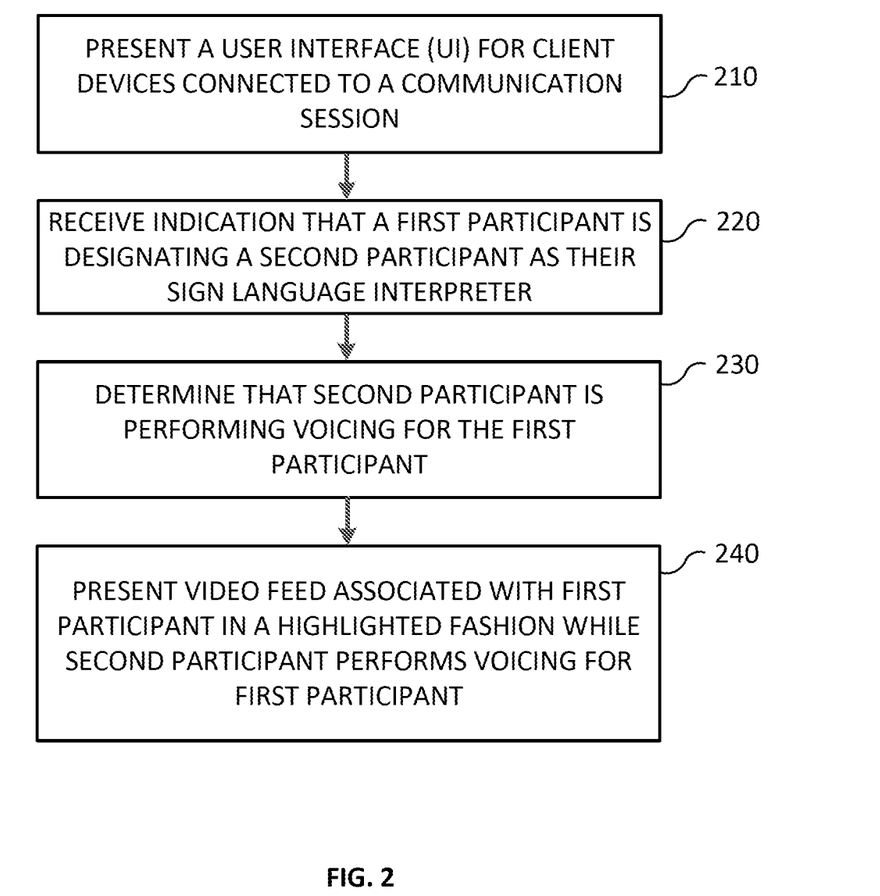
FIG. 2 is a flow chart illustrating an exemplary method that may be performed in some embodiments.

In an embodiment, the processing engine 102 may perform the exemplary method of FIG. 2 or other method herein and, as a result, provide an active speaker proxy presentation for sign language interpreters within a video communication platform. In some embodiments, this may be accomplished via communication with the client device, processing engine, video communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or video communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the client device 150. In some embodiments, one or more of the video communication platform 140, processing engine 102, and client device 150 may be the same device. In some embodiments, the user's client device 150 is associated with a first user account within a video communication platform, and one or more additional client device(s) may be associated with additional user account(s) within the video communication platform.

In some embodiments, optional repositories can include one or more of a settings repository 130, profile repository 132, and/or interpreter repository 134. The optional repositories function to store and/or maintain, respectively, settings and/or preferences selected by participants of a video communication session; profile information related to participants; and information relating to participants designated as SLIs within the video communication session. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate meetings, presentations (e.g., video presentations) and/or any other communication between two or more parties, such as within, e.g., a video conference or virtual classroom. A video communication session within the video communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
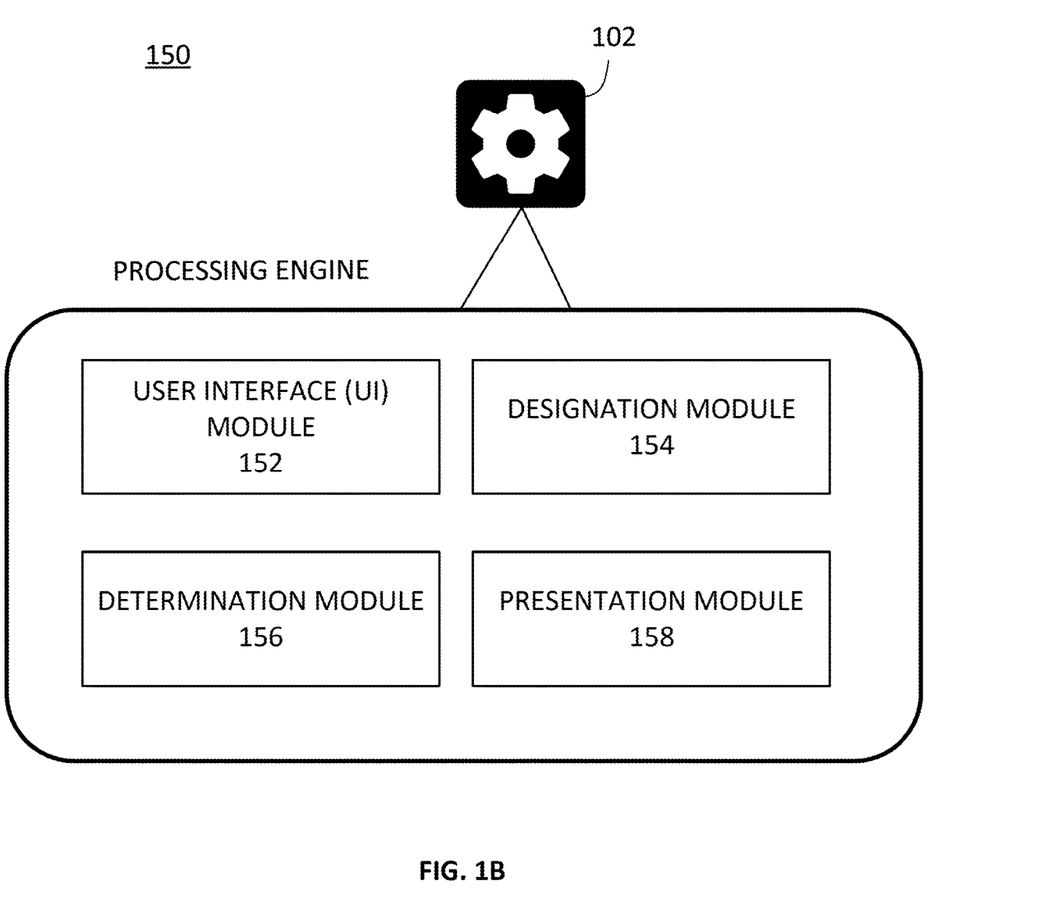
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

User interface module 152 functions to present a UI for each of a number of client devices connected to a communication session, with each UI including one or more video feeds associated with participants of the communication session.

Designation module 154 functions to receive an indication that a first participant is designating a second participant as an SLI who will perform voicing for the first participant.

Determination module 156 functions to determine that the second participant is performing voicing for the first participant.

Presentation module 158 functions to present, within the UIs of at least a subset of the client devices, a video feed associated with the first participant in a highlighted fashion concurrently to the second participant performing the voicing for the first participant.

The above modules and their functions will be described in further detail in relation to an exemplary method below.

FIG. 2 is a flow chart illustrating an exemplary method that may be performed in some embodiments.

At step 210, the system presents a UI for each of a number of client devices connected to a communication session, with each UI including one or more video feeds associated with participants of the communication session.

In some embodiments, the system connects participants to a live communication stream via their respective client devices. The communication stream may be any "session" (such as an instance of a video conference, webinar, informal chat session, or any other suitable session) initiated and hosted via the video communication platform, for remotely communicating with one or more users of the video communication platform, i.e., participants within the video communication session. Participants are connected on user devices, and are associated with user accounts within the communication platform.

The UI for the video communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the video communication platform. In various embodiments, the UI is configured to allow the participant to, e.g., navigate within the video communication session, engage or interact with one or more functional elements within the video communication session, control one or more aspects of the video communication session, and/or configure one or more settings or preferences within the video communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using their smartphone to record video of themselves giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a video communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing the participant's screen with other participants, recording the video session, and/or ending the video session.

At least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

At step 220, the system receives an indication that a first participant is designating a second participant as an SLI who will perform voicing for the first participant. In some embodiments, the indication is received via a client device associated with the first participant. In some embodiments, the client device presents a UI to the first participant, as in step 210, and the UI contains one or more UI elements allowing the first participant to designate another participant as an SLI. In some embodiments, UI elements may not appear within the UI directly, but can appear upon the participant navigating to another screen or portion of the UI, such as a settings page of profile page. In some embodiments, only a participant pre-designated as, e.g., a non-verbal participant, sign-language-using participant, DHH participant, or similar participant in need of another user to speak on their behalf may indicate such a designation of an SLI. In some embodiments, the first participant may only designate another participant who has been pre-designated as an SLI participant. In various embodiments, such pre-designations may be assigned via one or more settings parameters, profile information, or other sources of data, and may be submitted by the participant, another participant with authorization to do so, an administrator with authorization to do so, or any other suitable person or entity.

In some embodiments, receiving the indication includes determining that the first participant has selected a profile or settings parameter designating the second participant as the sign language interpreter for the first participant. For example, within a "Settings" UI element, a subpage named "Accessibility" or similar may appear. Within that subpage, a parameter may be labeled such as "Designate a sign language interpreter to speak for you". Upon the user interacting with that parameter, the user may be allowed to choose one or more participants or other users to be designated. In some embodiments, the list may be limited to users who have been pre-designated as SLIs, users who are participants of the current communication session, trusted or authorized users known by the user, or any other suitable participants or users within the communication platform.

In some embodiments, receiving the indication includes receiving a selection within the UI from the first participant indicating that the second participant is to be designated as a sign language interpreter for the first participant. For example, in some embodiments, a user may be able to right-click or otherwise interact with a video feed of another participant, and then select from a sub-menu an option for designating that participant as an SLI. Any of a number of other ways of allowing a user to designate an SLI via the UI may be contemplated.

In some embodiments, receiving the indication includes determining that the second participant has connected to the communication session via a connecting link designated for a sign language interpreter. For example, the first participant may use the UI to request a link to be generated by the system specifically for an SLI the first participant wishes to make use of. Upon the link being created, the first participant may be able to invite the second participant, or any other SLI individual of their choice, by sending them the generated link (such as by, e.g., copying the link and pasting it within a chat message to be sent to the intended SLI). Upon the SLI clicking on the link, the system may determine that the individual who clicked on the link is not the first participant and is intended to be an SLI for the first user.

In some embodiments, the system may receive a behavioral profile for the first participant which indicates, e.g., that the first participant is a non-verbal user or that the user has designated one or more other users as SLIs in previous sessions. In varying embodiments, the behavioral profile may be an existing profile related to a particular participant and/or their user account within the video communication platform. In some embodiments, the behavioral profile may include a number of behaviors associated with that participant with respect to the video communication platform, such as, e.g., preferences for video sessions, previous selections of options within the video communication platform, routines or habits detected by the video communication platform with respect to video sessions or use of the client device, detected metrics of user engagement for past and/or current video sessions, or any other suitable behaviors within the video communication platform. In some embodiments, the system determines one or more non-verbal forms of expression (e.g., ASL) associated with the behavioral profile for the participant. In some embodiments, this may include determining a set of non-verbal expressions from the listed behaviors from the behavioral profile.

In some embodiments, the first participant may designate one or more additional participants as additional SLI participants. In some embodiments, the additional SLI participants may also perform voicing for the first participant. For example, during a particular event, multiple interpreters may be involved and transition responsibilities during longer events (e.g., an event that lasts several hours). The additional SLI participants are configured similarly to the initial SLI participant, and similarly, the first participant is shown in a highlighted fashion when one of the additional SLI participants performs voicing on behalf of the first participant.

At step 230, the system determines that the second participant is performing voicing for the first participant. Within this context, "performing voicing" includes the second participant speaking on behalf of the first participant when the first participant begins expressing themselves in non-verbal communication, such as via, e.g., a sign language of their choice.

In some embodiments, determining that the second participant is performing voicing for the first participant includes identifying one or both of: the second participant beginning to speak within the communication session, and/or the first participant performing sign language expression within the communication session. For example, the system may be configured to identify that the second participant has begun to speak, and may determine based on this that the second participant is speaking for the first participant; or may identify that the first participant is using sign language gestures, and determine based on this that the second participant will be translating for the first participant; or the system may identify a combination of both.

In some embodiments, the determination that the second participant is performing voicing for the first participant is performed via one or more machine learning ("ML") techniques. In some embodiments, machine vision ("MV") techniques may be used to identify that the first participant is non-verbally communicating in sign language. In some embodiments, one or more ML and/or MV techniques may be used not just to identify that sign language is being used, but also to recognize the content of the sign language expression. The content may then be used to determine whether there is a match or similarity between the non-verbal expression and speech from the second participant. In some embodiments, such ML or MV techniques may be performed in real time or substantially real time during a communication session. In some embodiments, a deep learning model may be used for detection and classification of participant movements, facial expressions, or any other suitable indication of a non-verbal cue or non-verbal communication. Such a deep learning model may be trained based on one or more datasets which include a variety of sign language communication from a multitude of different people. Datasets may additionally or alternatively include, e.g., still frames and/or video from a number of prior video communication sessions, either with one or more of the participants from this video session or with none of the participants from this video session.

At step 240, the system presents, within the UIs of at least a subset of the client devices, a video feed associated with the first participant in a highlighted fashion concurrently to the second participant performing the voicing for the first participant. In various embodiments, highlighting may mean, in various embodiments, showing the video feed of that user as the "active speaker", i.e., the visible or prominent feed shown to other participants; or providing some visual adjustment to a UI component for the video feed, such as a colored border around the feed or a resizing to make the feed appear larger than other feeds; or any other suitable way to highlight the video feed of the non-verbal participant while their interpreter is speaking on their behalf.

In some embodiments, the video feed associated with the first participant is presented in a highlighted fashion within the UIs of all participants other than the first participant. In this fashion, all other participants would see the non-verbal participant expressing themselves in non-verbal communication, and simultaneously hear the SLI voicing that communication on behalf of the non-verbal user. In some embodiments, the other participants may see the SLI as well as the non-verbal participant, while in other embodiments, the SLI may be not visible, either via being hidden by the system or by not being selectable by the system as an active speaker.

In some embodiments, the system presents, within the UI of the first participant, a video feed associated with the last participant who spoke prior to the second participant performing the voicing for the first participant. While the other participants may have interest in seeing the non-verbal participant as an "active speaker", the non-verbal participant themselves may have no interest in seeing their own video feed as active speaker, nor the video of the SLI performing the voicing. In some embodiments, therefore, another option for displaying a video feed may be presented to the participant, such as the last person who actively spoke prior to the second participant speaking.

In some embodiments, the system presents, within the UI of the first participant, a video feed associated with the second participant performing the voicing for the first participant. Such a video feed may be presented to the first participant in lieu of presenting the first participant with a video feed of themselves as active speaker.

In some embodiments, a number of the video feeds are simultaneously presented within the UI. This may be known as a "Gallery View" or similar. In some embodiments, the video feed being presented in a highlighted fashion involves a visual modification to a UI component (such as, for example, a window or frame component) for the video feed. In some embodiments, the visual modification to the UI component for the video feed comprises a change in one or more of: the presented size, presented color, and/or presented position of the UI component. Other possibilities for visual modification or adjustment to the UI component may exist.

In some embodiments, one of the video feeds is presented at a time within the UI based on the current actively speaking participant within the communication session. This may be known as an "Active Speaker View" or similar. In some embodiments, the video feed being presented in a highlighted fashion involves the video feed associated with the first participant being visible and the video feed associated with the second participant being not visible within the UI. In this fashion, the video feed of the non-verbal participant (i.e., the first participant) is the "active speaker", highlighted by being the only visible feed in the UI for participants, while the video feed of the SLI is hidden or not visible, rather than being the active speaker.

In some embodiments, the system presents, within the UIs of at least a subset of the client devices, an additional video feed associated with the second participant, with the additional video feed including a label marking the second participant as a sign language interpreter. In such a configuration, the SLI and the non-verbal participant may both have feeds which are presented side-by-side, with the SLI being labeled as a sign language interpreter. In some additional or alternative embodiments, the video feed associated with the first participant includes a label marking the first participant as a non-verbal participant, DHH individual, sign language user, or similar.

Figure 3:
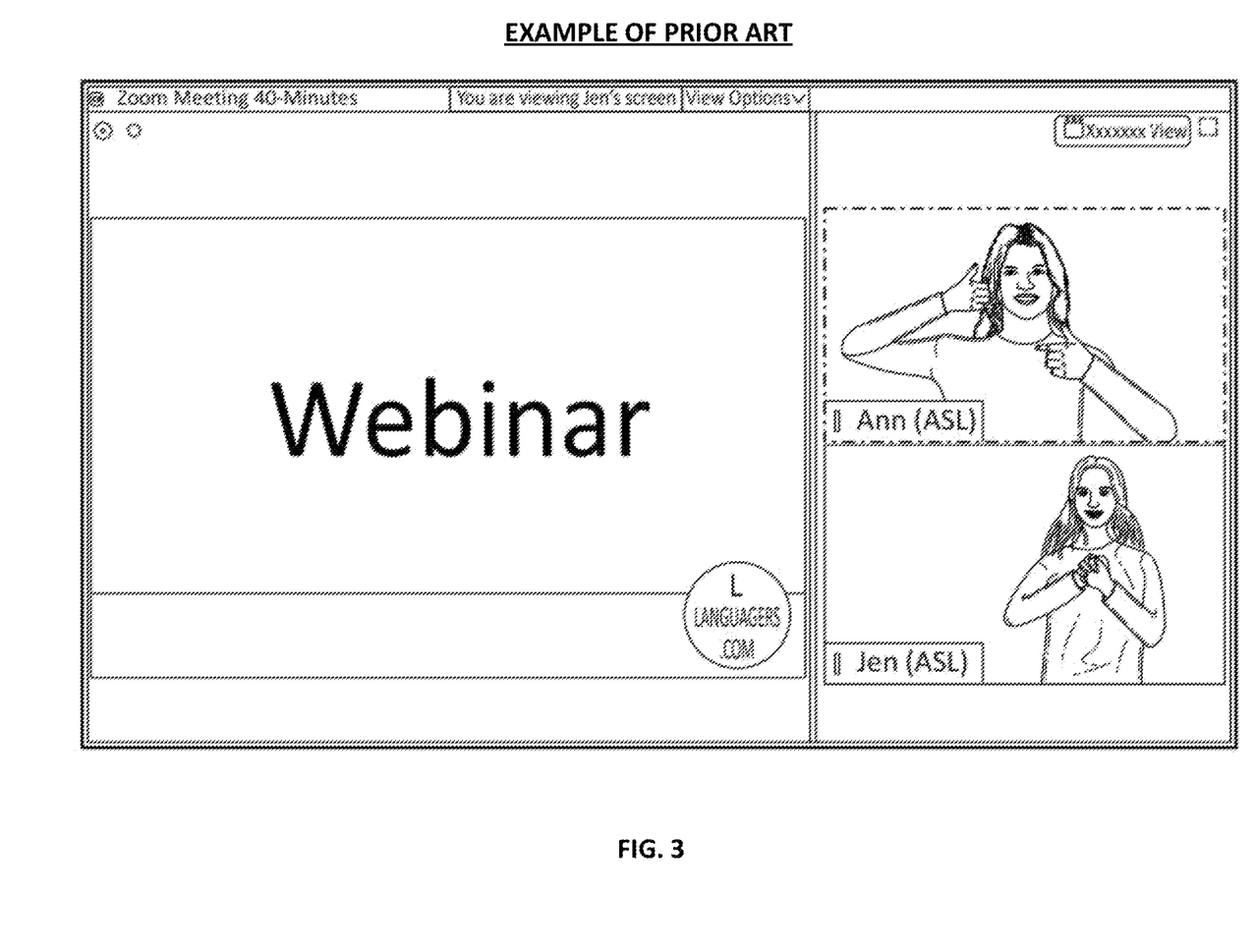
FIG. 3 is a diagram illustrating one example of a prior art method for presenting sign language interpreters.

FIG. 3 is a diagram illustrating one example of a prior art method for presenting sign language interpreters.

Within this prior art example, a UI is presented for a video communication session. The UI shows three separate UI components. On the left, a presentation with a number of slides is presented. On the right, two video feeds are presented, each showing an SLI providing bi-directional interpretation (i.e., both signing and voicing) for a different non-verbal individual. As can be seen from this example, the only visible, active speakers shown are the two SLI participants. The non-verbal participants themselves are not visible on the screen, even though they are the ones who are communicating and expressing their thoughts. This prior art example illustrates an inequitable and undesirable situation.

Figure 4:
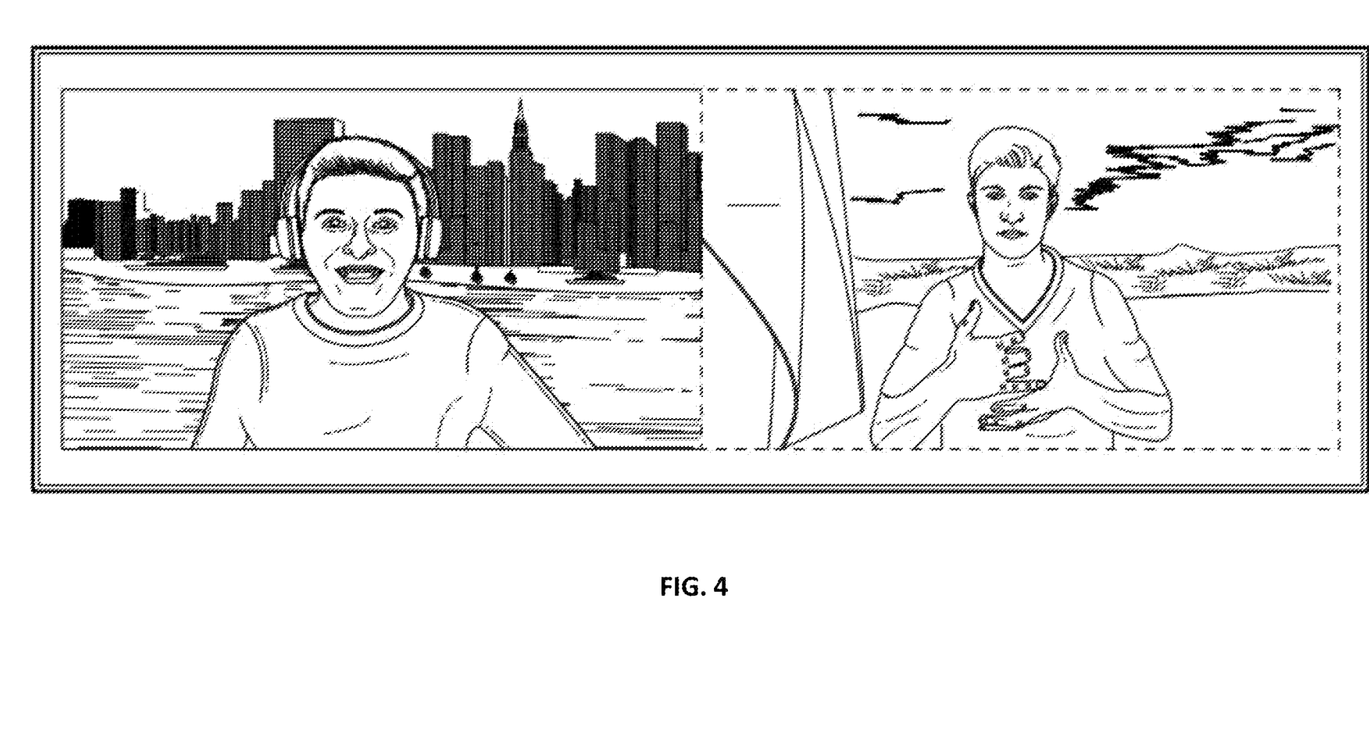
FIG. 4 is a diagram illustrating one example embodiment of presenting an active speaker proxy presentation for a sign language interpreter, according to some embodiments.

FIG. 4 is a diagram illustrating one example embodiment of presenting an active speaker proxy presentation for a sign language interpreter, according to some embodiments.

In the illustrated example, a UI is presented which shows two video feeds side-by-side. On the right is the non-verbal participant. On the left is another participant of the session. A border around the UI component of the video feed on the right indicates that the non-verbal participant on the right is the actively speaking individual. Even though an SLI participant is performing voicing on behalf of the non-verbal participant on the right, the SLI participant is not shown within the UI, and the non-verbal participant is shown as the active speaker. This is an equitable and desirable outcome, as the person who is communicating and expressing their thoughts, the non-verbal participant, is given the highlighted presentation and active speaker status.

Figure 5:
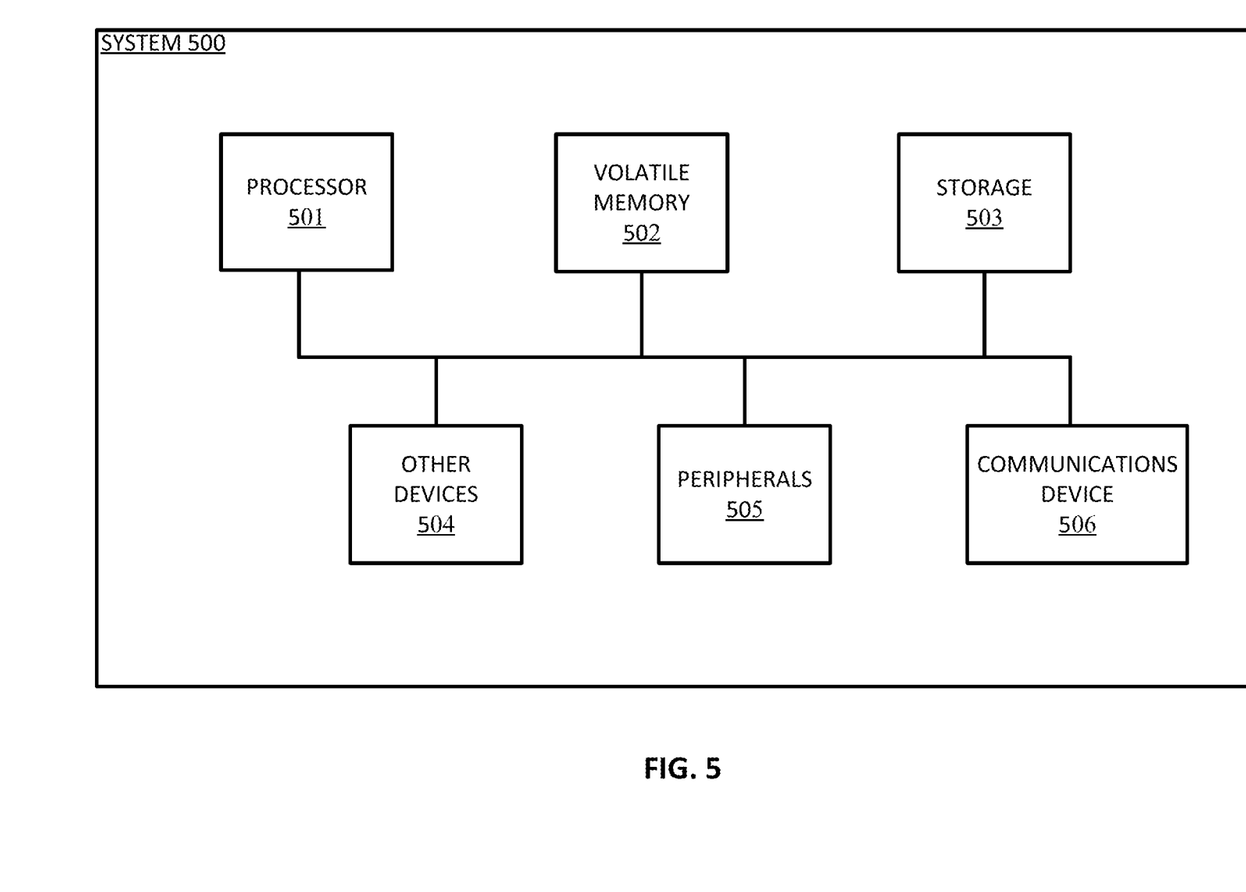
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1. A method comprising: presenting a user interface (UI) for each of a plurality of client devices connected to a communication session, each UI comprising one or more video feeds associated with participants of the communication session; receiving an indication that a first participant is designating a second participant as a sign language interpreter who will perform voicing for the first participant; determining that the second participant is performing voicing for the first participant; and presenting, within the UIs of at least a subset of the client devices, a video feed associated with the first participant in a highlighted fashion concurrently to the second participant performing the voicing for the first participant.

Example 2. The method of example 1, wherein the video feed associated with the first participant is presented in a highlighted fashion within the UIs of all participants other than the first participant.

Example 3. The method of example 2, further comprising: presenting, within the UI of the first participant, a video feed associated with the last participant who spoke prior to the second participant performing the voicing for the first participant.

Example 4. The method of example 2, further comprising: presenting, within the UI of the first participant, a video feed associated with the second participant performing the voicing for the first participant.

Example 5. The method of any of examples 1-4, wherein receiving the indication comprises determining that the first participant has selected a profile or settings parameter designating the second participant as the sign language interpreter for the first participant.

Example 6. The method of any of examples 1-5, wherein receiving the indication comprises receiving a selection within the UI from the first participant indicating that the second participant is to be designated as a sign language interpreter for the first participant.

Example 7. The method of any of examples 1-6, wherein determining that the second participant is performing voicing for the first participant comprises identifying one or both of: the second participant beginning to speak within the communication session, and the first participant performing sign language expression within the communication session.

Example 8. The method of any of examples 1-7, wherein the determination that the second participant is performing voicing for the first participant is performed via one or more machine learning techniques.

Example 9. The method of any of examples 1-8, wherein a plurality of the video feeds are simultaneously presented within the UI, the video feed being presented in a highlighted fashion comprising a visual modification to a UI component for the video feed.

Example 10. The method of example 9, wherein the visual modification to the UI component for the video feed comprises a change in one or more of: the presented size, presented color, and presented position of the UI component.

Example 11. The method of any of examples 1-10, wherein one of the video feeds is presented at a time within the UI based on the current actively speaking participant within the communication session, the video feed being presented in a highlighted fashion comprising the video feed associated with the first participant being visible and the video feed associated with the second participant being not visible within the UI.

Example 12. The method of any of examples 1-11, wherein receiving the indication comprises determining that the second participant has connected to the communication session via a connecting link designated for a sign language interpreter.

Example 13. The method of any of examples 1-12, further comprising: presenting, within the UIs of at least a subset of the client devices, an additional video feed associated with the second participant, the additional video feed comprising a label marking the second participant as a sign language interpreter.

Example 14. The method of example 13, wherein the video feed associated with the first participant comprises a label marking the first participant as a non-verbal participant.

Example 15. The method of any of examples 1-14, wherein receiving the indication comprises determining that the first participant has selected a profile or settings parameter designating the second participant as the sign language interpreter for the first participant.

Example 16. The method of any of examples 1-15, wherein receiving the indication comprises receiving a selection within the UI from the first participant indicating that the second participant is to be designated as a sign language interpreter for the first participant.

Example 17. The method of any of examples 1-16, wherein determining that the second participant is performing voicing for the first participant comprises identifying one or both of: the second participant beginning to speak within the communication session, and the first participant performing sign language expression within the communication session.

Example 18. The method of any of examples 1-17, wherein the first participant may designate one or more additional participants as additional SLI participants, wherein the additional SLI participants also perform voicing for the first participant.

Example 19. A communication system comprising one or more processors configured to perform the operations of: presenting a user interface (UI) for each of a plurality of client devices connected to a communication session, each UI comprising one or more video feeds associated with participants of the communication session; receiving an indication that a first participant is designating a second participant as a sign language interpreter who will perform voicing for the first participant; determining that the second participant is performing voicing for the first participant; and presenting, within the UIs of at least a subset of the client devices, a video feed associated with the first participant in a highlighted fashion concurrently to the second participant performing the voicing for the first participant.

Example 20. The communication system of any of examples 1-19, wherein the video feed associated with the first participant is presented in a highlighted fashion within the UIs of all participants other than the first participant.

Example 21. The communication system of example 20, wherein the one or more processors are further configured to perform the operation of: presenting, within the UI of the first participant, a video feed associated with the last participant who spoke prior to the second participant performing the voicing for the first participant.

Example 22. The communication system of example 20, wherein the one or more processors are further configured to perform the operation of: presenting, within the UI of the first participant, a video feed associated with the second participant performing the voicing for the first participant.

Example 23. The communication system of any of examples 1-22, wherein receiving the indication comprises determining that the first participant has selected a profile or settings parameter designating the second participant as the sign language interpreter for the first participant.

Example 24. The communication system of any of examples 1-23, wherein receiving the indication comprises receiving a selection within the UI from the first participant indicating that the second participant is to be designated as a sign language interpreter for the first participant.

Example 25. The communication system of any of examples 1-24, wherein determining that the second participant is performing voicing for the first participant comprises identifying one or both of: the second participant beginning to speak within the communication session, and the first participant performing sign language expression within the communication session.

Example 26. The communication system of any of examples 1-25, wherein the determination that the second participant is performing voicing for the first participant is performed via one or more machine learning techniques.

Example 27. The communication system of any of examples 1-26, wherein a plurality of the video feeds are simultaneously presented within the UI, the video feed being presented in a highlighted fashion comprising a visual modification to a UI component for the video feed.

Example 28. The communication system of example 27, wherein the visual modification to the UI component for the video feed comprises a change in one or more of: the presented size, presented color, and presented position of the UI component.

Example 29. The communication system of any of examples 1-28, wherein one of the video feeds is presented at a time within the UI based on the current actively speaking participant within the communication session, the video feed being presented in a highlighted fashion comprising the video feed associated with the first participant being visible and the video feed associated with the second participant being not visible within the UI.

Example 30. The communication system of any of examples 1-29, wherein receiving the indication comprises determining that the second participant has connected to the communication session via a connecting link designated for a sign language interpreter.

Example 31. The communication system of any of examples 1-30, wherein the one or more processors are further configured to perform the operation of: presenting, within the UIs of at least a subset of the client devices, an additional video feed associated with the second participant, the additional video feed comprising a label marking the second participant as a sign language interpreter.

Example 32. The communication system of example 31, wherein the video feed associated with the first participant comprises a label marking the first participant as a non-verbal participant.

Example 33. The communication system of any of examples 1-32, wherein receiving the indication comprises determining that the first participant has selected a profile or settings parameter designating the second participant as the sign language interpreter for the first participant.

Example 34. The communication system of any of examples 1-33, wherein receiving the indication comprises receiving a selection within the UI from the first participant indicating that the second participant is to be designated as a sign language interpreter for the first participant.

Example 35. The communication system of any of examples 1-34, wherein determining that the second participant is performing voicing for the first participant comprises identifying one or both of: the second participant beginning to speak within the communication session, and the first participant performing sign language expression within the communication session.

Example 36. The communication system of any of examples 1-35, wherein the first participant may designate one or more additional participants as additional SLI participants, wherein the additional SLI participants also perform voicing for the first participant.

Example 37. A non-transitory computer-readable medium containing instructions for generating a note with session content from a communication session, comprising: instructions for presenting a user interface (UI) for each of a plurality of client devices connected to a communication session, each UI comprising one or more video feeds associated with participants of the communication session; instructions for receiving an indication that a first participant is designating a second participant as a sign language interpreter who will perform voicing for the first participant; instructions for determining that the second participant is performing voicing for the first participant; and instructions for presenting, within the UIs of at least a subset of the client devices, a video feed associated with the first participant in a highlighted fashion concurrently to the second participant performing the voicing for the first participant.

Example 38. The non-transitory computer-readable medium of any of examples 1-37, wherein the video feed associated with the first participant is presented in a highlighted fashion within the UIs of all participants other than the first participant.

Example 39. The non-transitory computer-readable medium of example 38, further comprising: presenting, within the UI of the first participant, a video feed associated with the last participant who spoke prior to the second participant performing the voicing for the first participant.

Example 40. The non-transitory computer-readable medium of example 38, further comprising: presenting, within the UI of the first participant, a video feed associated with the second participant performing the voicing for the first participant.

Example 41. The non-transitory computer-readable medium of any of examples 1-40, wherein receiving the indication comprises determining that the first participant has selected a profile or settings parameter designating the second participant as the sign language interpreter for the first participant.

Example 42. The non-transitory computer-readable medium of any of examples 1-41, wherein receiving the indication comprises receiving a selection within the UI from the first participant indicating that the second participant is to be designated as a sign language interpreter for the first participant.

Example 43. The non-transitory computer-readable medium of any of examples 1-42, wherein determining that the second participant is performing voicing for the first participant comprises identifying one or both of: the second participant beginning to speak within the communication session, and the first participant performing sign language expression within the communication session.

Example 44. The non-transitory computer-readable medium of any of examples 1-43, wherein the determination that the second participant is performing voicing for the first participant is performed via one or more machine learning techniques.

Example 45. The non-transitory computer-readable medium of any of examples 1-44, wherein a plurality of the video feeds are simultaneously presented within the UI, the video feed being presented in a highlighted fashion comprising a visual modification to a UI component for the video feed.

Example 46. The non-transitory computer-readable medium of example 45, wherein the visual modification to the UI component for the video feed comprises a change in one or more of: the presented size, presented color, and presented position of the UI component.

Example 47. The non-transitory computer-readable medium of any of examples 1-46, wherein one of the video feeds is presented at a time within the UI based on the current actively speaking participant within the communication session, the video feed being presented in a highlighted fashion comprising the video feed associated with the first participant being visible and the video feed associated with the second participant being not visible within the UI.

Example 48. The non-transitory computer-readable medium of any of examples 1-47, wherein receiving the indication comprises determining that the second participant has connected to the communication session via a connecting link designated for a sign language interpreter.

Example 49. The non-transitory computer-readable medium of any of examples 1-48, further comprising: presenting, within the UIs of at least a subset of the client devices, an additional video feed associated with the second participant, the additional video feed comprising a label marking the second participant as a sign language interpreter.

Example 50. The non-transitory computer-readable medium of example 49, wherein the video feed associated with the first participant comprises a label marking the first participant as a non-verbal participant.

Example 51. The non-transitory computer-readable medium of any of examples 1-50, wherein receiving the indication comprises determining that the first participant has selected a profile or settings parameter designating the second participant as the sign language interpreter for the first participant.

Example 52. The non-transitory computer-readable medium of any of examples 1-51, wherein receiving the indication comprises receiving a selection within the UI from the first participant indicating that the second participant is to be designated as a sign language interpreter for the first participant.

Example 53. The non-transitory computer-readable medium of any of examples 1-52, wherein determining that the second participant is performing voicing for the first participant comprises identifying one or both of: the second participant beginning to speak within the communication session, and the first participant performing sign language expression within the communication session.

Example 54. The non-transitory computer-readable medium of any of examples 1-53, wherein the first participant may designate one or more additional participants as additional SLI participants, wherein the additional SLI participants also perform voicing for the first participant.

Some portions of the preceding detailed descriptions have been presented in terms of algorithms and symbolic representations of operations on data bits within a computer memory.

These algorithmic descriptions and representations are the ways used by those skilled in the data processing arts to most effectively convey the substance of their work to others skilled in the art.

An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   establishing a communication session for a plurality of client devices;
   receiving an indication that a first participant is designating a second participant as a sign language interpreter who will perform voicing for the first participant;
   determining that the second participant is performing voicing for the first participant; and
   providing an indication to present, within user interfaces ("UIs") of at least a subset of the client devices, a video feed associated with the first participant in a highlighted fashion concurrently to the second participant performing the voicing for the first participant and instead of presenting the video feed associated with the second participant in a highlighted fashion.

2. The method of claim 1, wherein the video feed associated with the first participant is indicated to be presented in a highlighted fashion within the UIs of all participants other than the first participant.

3. The method of claim 2, further comprising:
   providing an indication to present, within the UI of the first participant, a video feed associated with the last participant who spoke prior to the second participant performing the voicing for the first participant.

4. The method of claim 2, further comprising:
   providing an indication to present, within the UI of the first participant, a video feed associated with the second participant performing the voicing for the first participant.

5. The method of claim 1, wherein receiving the indication comprises determining that the first participant has selected a profile or settings parameter designating the second participant as the sign language interpreter for the first participant.

6. The method of claim 1, wherein receiving the indication comprises receiving a selection within the UI from the first participant indicating that the second participant is to be designated as a sign language interpreter for the first participant.

7. The method of claim 1, wherein determining that the second participant is performing voicing for the first participant comprises identifying one or both of: the second participant beginning to speak within the communication session, and the first participant performing sign language expression within the communication session.

8. The method of claim 1, wherein the determination that the second participant is performing voicing for the first participant is performed via one or more machine learning techniques.

9. The method of claim 1, wherein a plurality of the video feeds are simultaneously presented within the UI, the video feed being presented in a highlighted fashion comprising a visual modification to a UI component for the video feed.

10. The method of claim 9, wherein the visual modification to the UI component for the video feed comprises a change in one or more of: the presented size, presented color, and presented position of the UI component.

11. The method of claim 1, wherein one of the video feeds is presented at a time within the UI based on the current actively speaking participant within the communication session, the video feed being presented in a highlighted fashion comprising the video feed associated with the first participant being visible and the video feed associated with the second participant being not visible within the UI.

12. The method of claim 1, wherein receiving the indication comprises determining that the second participant has connected to the communication session via a connecting link designated for a sign language interpreter.

13. The method of claim 1, further comprising:
    providing an indication to present, within the UIs of at least a subset of the client devices, an additional video feed associated with the second participant, the additional video feed comprising a label marking the second participant as a sign language interpreter.

14. The method of claim 13, wherein the video feed associated with the first participant comprises a label marking the first participant as a non-verbal participant.

15. A communication system comprising:
    a non-transitory computer-readable medium; and
    one or more processors configured to execute processor-executable instructions stored in the non-transitory computer-readable medium configured to cause the one or more processors to:
    establish a communication session for a plurality of client devices;
    receiving an indication that a first participant is designating a second participant as a sign language interpreter who will perform voicing for the first participant;
    determining that the second participant is performing voicing for the first participant; and
    provide an indication to present, within user interfaces ("UIs") of at least a subset of the client devices, a video feed associated with the first participant in a highlighted fashion concurrently to the second participant performing the voicing for the first participant and instead of presenting the video feed associated with the second participant in a highlighted fashion.

16. The communication system of claim 15, wherein the one or more processors are configured to execute further processor-executable instructions stored in the non-transitory computer-readable medium to determine that the first participant has selected a profile or settings parameter designating the second participant as the sign language interpreter for the first participant.

17. The communication system of claim 15, wherein the one or more processors are configured to execute further processor-executable instructions stored in the non-transitory computer-readable medium to receive a selection within the UI from the first participant indicating that the second participant is to be designated as a sign language interpreter for the first participant.

18. The communication system of claim 15, wherein the one or more processors are configured to execute further processor-executable instructions stored in the non-transitory computer-readable medium to identify one or both of: the second participant beginning to speak within the communication session, and the first participant performing sign language expression within the communication session.

19. The communication system of claim 15, wherein the first participant may designate one or more additional participants as additional SLI participants, wherein the additional SLI participants also perform voicing for the first participant.

20. A non-transitory computer-readable medium containing processor-executable instructions configured to cause one or more processors to:

establish a communication session for a plurality of client devices;
receiving an indication that a first participant is designating a second participant as a sign language interpreter who will perform voicing for the first participant;
determining that the second participant is performing voicing for the first participant; and
provide an indication to present, within user interfaces ("UIs") of at least a subset of the client devices, a video feed associated with the first participant in a highlighted fashion concurrently to the second participant performing the voicing for the first participant and instead of presenting the video feed associated with the second participant in a highlighted fashion.

* * * * *